(12) United States Patent
Dow et al.

(10) Patent No.: US 9,865,281 B2
(45) Date of Patent: Jan. 9, 2018

(54) CONVERSATIONAL ANALYTICS

(71) Applicant: INTERNATIONAL BUSINESS MACHINES CORPORATION, Armonk, NY (US)

(72) Inventors: Eli M. Dow, Wappingers Falls, NY (US); Thomas D. Fitzsimmons, Poughkeepsie, NY (US); Tynan J. Garrett, Poughkeepsie, NY (US); Emily M. Metruck, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 14/843,382

(22) Filed: Sep. 2, 2015

(65) Prior Publication Data
US 2017/0061989 A1 Mar. 2, 2017

(51) Int. Cl.
*G06K 9/00* (2006.01)
*G10L 25/57* (2013.01)
(Continued)

(52) U.S. Cl.
CPC .......... *G10L 25/57* (2013.01); *G06K 9/00281* (2013.01); *G06K 9/00315* (2013.01);
(Continued)

(58) Field of Classification Search
CPC G06K 9/00302; G06K 9/00355; G10L 25/63; H04L 12/1831; H04L 65/403; H04N 7/147
See application file for complete search history.

(56) References Cited

U.S. PATENT DOCUMENTS 7,769,705 B1  8/2010  Luechtefeld
8,069,131 B1  11/2011  Luechtefeld et al.
(Continued)

FOREIGN PATENT DOCUMENTS

EP   1271469 A1   1/2003
EP   0947161 B1   2/2006
(Continued)

OTHER PUBLICATIONS

U.S. Appl. No. 14/918,991, Entitled "Conversational Analytics", filed Oct. 21, 2015.
(Continued)

*Primary Examiner* — Gandhi Thirugnanam
(74) *Attorney, Agent, or Firm* — Tihon Poltavets

(57) ABSTRACT

A computer-implemented method includes determining a meeting has initialized between a first user and a second user, wherein vocal and video recordings are produced for at least the first user. The method receives the vocal and video recordings for the first user. The method analyzes the vocal and video recordings for the first user according to one or more parameters for speech and one or more parameters for gestures. The method determines one or more emotions and a role in the meeting for the first user based at least on the analyzed vocal and video recordings. The method sends an output of analysis to at least one of the first user and the second user, wherein the output of analysis includes at least the determined one or more emotions and the role in the meeting for the first user.

15 Claims, 4 Drawing Sheets

(51) Int. Cl.
| | |
|---|---|
| G10L 25/63 | (2013.01) |
| G10L 15/30 | (2013.01) |
| H04L 29/06 | (2006.01) |
| H04N 7/15 | (2006.01) |
| H04L 12/18 | (2006.01) |
| H04N 7/14 | (2006.01) |
| G10L 25/72 | (2013.01) |

(52) U.S. Cl.
CPC .......... *G06K 9/00355* (2013.01); *G10L 15/30* (2013.01); *G10L 25/63* (2013.01); *H04L 12/1831* (2013.01); *H04L 65/1083* (2013.01); *H04L 65/403* (2013.01); *H04N 7/147* (2013.01); *H04N 7/15* (2013.01); *H04N 7/152* (2013.01); *G10L 25/72* (2013.01)

(56) References Cited

U.S. PATENT DOCUMENTS

| | | | |
|---|---|---|---|
| 8,321,437 | B2 | 11/2012 | Lim |
| 8,477,175 | B2* | 7/2013 | Shaffer ............ G06F 3/012 348/14.08 |
| 8,897,437 | B1* | 11/2014 | Tan .................. H04M 3/5175 379/265.02 |
| 8,898,098 | B1 | 11/2014 | Luechtefeld |
| 2004/0103148 | A1* | 5/2004 | Aldrich ............. G06F 3/0481 709/204 |
| 2009/0079816 | A1* | 3/2009 | Qvarfordt ........ G06K 9/00335 348/14.16 |
| 2010/0153390 | A1* | 6/2010 | Angell ............... G06Q 90/00 707/736 |
| 2012/0101873 | A1* | 4/2012 | Lepore ............. G06Q 10/06398 705/7.42 |
| 2012/0221336 | A1 | 8/2012 | Degani et al. |
| 2012/0290950 | A1* | 11/2012 | Rapaport .......... H04L 51/32 715/753 |
| 2014/0282089 | A1* | 9/2014 | West ............... H04L 65/403 715/753 |
| 2015/0193718 | A1* | 7/2015 | Shaburov ......... G06Q 10/06395 705/7.39 |
| 2017/0061989 | A1* | 3/2017 | Dow ................. G10L 25/57 |
| 2017/0109448 | A1* | 4/2017 | Adamy ............. G06F 17/3053 |

FOREIGN PATENT DOCUMENTS

| | | |
|---|---|---|
| EP | 1222448 B1 | 10/2006 |
| EP | 1125280 B1 | 1/2007 |
| EP | 2304718 A2 | 4/2011 |
| EP | 1901281 B1 | 3/2013 |
| WO | 9618184 A1 | 6/1996 |
| WO | 9841977 A1 | 9/1998 |

OTHER PUBLICATIONS

Appendix P.: List of IBM Patents or Patent Applications Treated as Related, Dated Oct. 21, 2015, 2 pages.

Ballin et al.; "A Framework For Interpersonal Attitude And Non-Verbal Communication In Improvisational Visual Media Production"; In: 1st European Conference on Visual Media Production (CVMP). IEE, London, UK Mar. 15-16, 2004. [Conference or Workshop Item] : Goldsmiths Research Online; 9 pages.

Hannel, Thaddaeus S.; "Pattern Recognition Integrated Sensing Methodologies (PRISMS) in Pharmaceutical Process Validation, Remote Sensing and Astrobiology"; UKnowledge; University of Kentucky Doctoral Dissertations, Paper 751; Copyright © Thaddaeus S. Hannel, 2009; 242 pages.

Lopez et al.; "Embedding Facilitation in Group Support Systems to Manage Distributed Group Behavior"; Proceedings of the 35th Hawaii International Conference on System Sciences; © 2002, IEEE; 9 pages.

Myers, Scott A.; "Instructor Socio-Communicative Style, Argumentativeness, and Verbal Aggressiveness in the College Classroom"; U.S. Department of Education, Educational Resources Information Center; Presented at the 1998 CSCA Meeting, Chicago, IL; Apr. 2-5, 1998; 22 pages.

* cited by examiner

CONVERSATIONAL ANALYTICS

BACKGROUND

The present invention relates generally to analytics and more particularly to conversational analytics among users.

Analytics represent the discovery and communication of patterns in data. Typically, analytics are performed on recorded information and rely on the simultaneous application of statistics, computer programming, and operations research to quantify a specific measure. Analytics are commonly applied to business data, to describe, predict, and improve business performance. Specifically, areas with analytics include predictive analytics, enterprise decision management, retail analytics, store assortment and stock-keeping unit optimization, marking optimization and marketing mix modeling, and web analytics. However, with the evolving world, the field of analytics is expanding through the use of newly discovered methods in computer science, statistics, and mathematics.

SUMMARY

Embodiments of the present invention includes a method, computer program product and computer system for analyzing vocal and video recordings. A computer-implemented method includes determining, by one or more processors, a meeting has initialized between a first user and a second user, wherein vocal and video recordings are produced for at least the first user; receiving, by one or more processors, the vocal and video recordings for the first user; analyzing, by one or more processors, the vocal and video recordings for the first user according to one or more parameters for speech and one or more parameters for gestures; determining, by one or more processors, one or more emotions and a role in the meeting for the first user based at least on the analyzed vocal and video recordings; and sending, by one or more processors, an output of analysis to at least one of the first user and the second user, wherein the output of analysis includes at least the determined one or more emotions and the role in the meeting for the first user.

DETAILED DESCRIPTION

Figure 1:
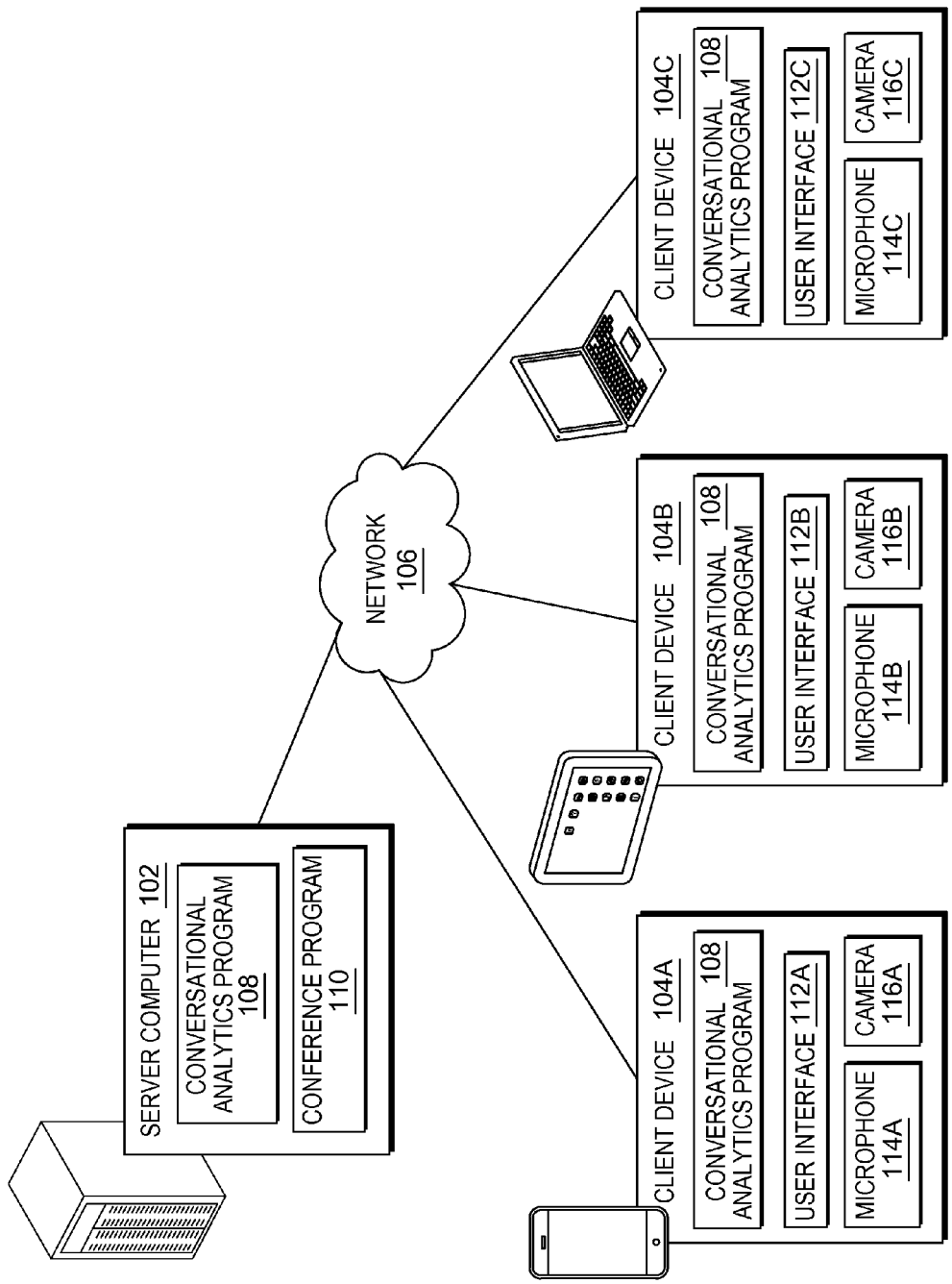
FIG. 1 is a functional block diagram illustrating a distributed data processing environment, in an embodiment in accordance with the present invention.

Example embodiments in accordance with the present invention will now be described in detail with reference to the drawing figures. FIG. 1 is a functional block diagram illustrating a distributed data processing environment. The distributed data processing environment includes server computer 102, client device 104A, client device 104B, and client device 104C interconnected over network 106.

Server computer 102 may be a desktop computer, a laptop computer, a tablet computer, a specialized computer server, a smartphone, or any other computer system known in the art. In certain embodiments, server computer 102 represents a computer system utilizing clustered computers and components that act as a single pool of seamless resources when accessed through network 106, as is common in data centers and with cloud computing applications. In general, server computer 102 is representative of any programmable electronic device or combination of programmable electronic devices capable of executing machine readable program instructions and communicating with other computer devices via a network. In this embodiment, server computer 102 includes conversational analytics program 108 and conference program 110 accessible by client device 104A, 104B, and 104C, via network 106.

Client device 104A, 104B, and 104C may be laptop computers, tablet computers, netbook computers, personal computers (PC), desktop computers, personal digital assistants (PDA), smart phones, wearable devices (e.g., smart watches, personal fitness devices, personal safety devices), or any programmable computer systems known in the art capable of communicating with other computer systems utilizing a camera and a microphone. In certain embodiments, client device 104A, 104B, and 104C represent computer systems utilizing clustered computers and components (e.g., database server computers, application server computers, etc.) that act as a single pool of seamless resources when accessed through network 106, as is common in data centers and with cloud-computing applications. In general, client device 104A, 104B, and 104C are representative of any programmable electronic device or combination of programmable electronic devices capable of executing machine readable program instructions and communicating with users of client device 104A, 104B, and 104C, via network 106. Client device 104A, 104B, and 104C may include components, as depicted and described in further detail with respect to FIG. 4, in accordance with embodiments of the present invention.

Client device 104A, 104B, and 104C each include conversational analytics program 108. Conversational analytics program 108 can either operate in a client-side based setting, for example on client device 104A, or conversational analytics program 108 can operate in a server-side based setting, for example on server computer 102. Conference program 110 on server computer 102 provides an online service for supporting meetings between the users of client device 104A, 104B, and 104C. Conference program 110 may be an online service providing an audio conference call, a video conference call, a computer simulated conference call, or any other type of electronic collaboration known in the art. In this embodiment, conversational analytics program 108 has the ability to determine a meeting has initialized between users of client device 104A, 104B, and 104C via conference program 110.

In one embodiment, conversational analytics program 108 has the ability to receive vocal and video recordings for a user of client device 104A and analyze the vocal and video recordings according to predefined vocal and visual metrics. Based on the analysis performed on the vocal and video recordings, conversational analytics program 108 has the ability to determine emotions and a role in the conversation for the user of client device 104A. Conversational analytics program 108 sends an output of the analysis to the other users participating in the meeting (i.e., users of client device 104B and 104C), where the analysis is displayed in user interface 112B and 112C, respectively.

In another embodiment, conversational analytics program 108 has the ability to receive a meeting type (e.g., interview or quarterly shareholders call) selection from a first user and determine when a meeting has initialized between the first user and a second user. Conversational analytics program 108 can receive and analyze vocal and video recordings for the first user to determine emotions and a role (e.g., interviewer or presenter) in a conversation for the first user. Conversational analytics program 108 can send output of the analysis to the first user, where the first user can view the results in a user interface (e.g., 112A) on a client device (e.g., client device 104A) from which the vocal and video recordings were received. Conversational analytics program 108 can provide suggestions to the user based on the analysis of the vocal and video recordings for the first user, as well as, the meeting type selection from the first user.

Client device 104A, 104B, and 104C include user interface (UI) 112A, 112B, 112C, respectively and various programs (not shown). Examples of programs that client device 104A, 104B, and 104C include are: a web browser, an e-mail client, security software (e.g., a firewall program, a geo-locating program, an encryption program, etc.), an instant messaging (IM) application (app), and a communication (e.g., phone) application. In an example, a user of client device 104A can interact with user interface 112A, such as a touch screen (e.g., display) that performs both input to a graphical user interface (GUI) and as an output device (e.g., a display) presenting a plurality of icons associated with software applications or images depicting the executing software application. Optionally, a software application (e.g., a web browser) can generate user interface 112A operating within the GUI of client device 104A.

User interface 112A, 112B, and 112C each accept input from a plurality of input/output (I/O) devices including, but not limited to, a tactile sensor interface (e.g., a touch screen, a touchpad) referred to as a multi-touch display. An I/O device interfacing with user interface 112A, 112B, and 112C may be connected to client device 104A, 104B, and 104C, respectively, which may operate utilizing wired (e.g., USB port) or wireless network communications (e.g., infrared, NFC, etc.).

Client device 104A, 104B, and 104C include microphone 114A, 114B, and 114C, respectively, for recording vocals for users associated with each of the client devices. Client device 104A, 104B, and 104C also include camera 116A, 116B and 116C, respectively, for recording gesture and facial expressions for users associated with each of the client devices.

In one embodiment, client device 104A, 104B, and 104C can include facial recognition software (not illustrated in FIG. 1) known in the art to identify a face of a user, record the variations in the facial features, and send the video recordings of the facial features to conversational analytics program 108. The facial recognition software has the ability to identify facial features such as, eyebrows, eyes, nose, mouth, tongue, chin, and ears. In addition to facial recognition software, client device 104A, 104B, and 104C can also include gesture recognition software (not illustrated in FIG. 1) known in the art to identify gestures being performed by a user, record the variations in the gestures, and send the video recordings of the gestures to conversational analytics program 108. The gesture recognition software has the ability to identify gestures such as, arms being crossed, arms being waved, fingers being pointed, and fists being clenched. In another embodiment, the facial recognition software and the gesture recognition software is located on server computer 102. Conversational analytics program 108 can receive the identified gestures from the gesture recognition software and the identified facial expressions from the facial recognition software, along with the vocal and video recordings for a user. Conversational analytics program 108 can analyze the identified facial expressions and the identified gestures, along with the vocal and video recordings for the user.

In general, network 106 can be any combination of connections and protocols that will support communications among server computer 102 and client device 104A, 104B, and 104C. Network 106 can include, for example, a local area network (LAN), a wide area network (WAN), such as the internet, a cellular network, or any combination of the preceding, and can further include wired, wireless, and/or fiber optic connections. In one embodiment, conversational analytics program 108 can be a web service accessible via network 106 to a user of client device 104A, 104B, and 104C. In another embodiment, conversational analytics program 108 may be operated directly by a user of server computer 102.

Figure 2:
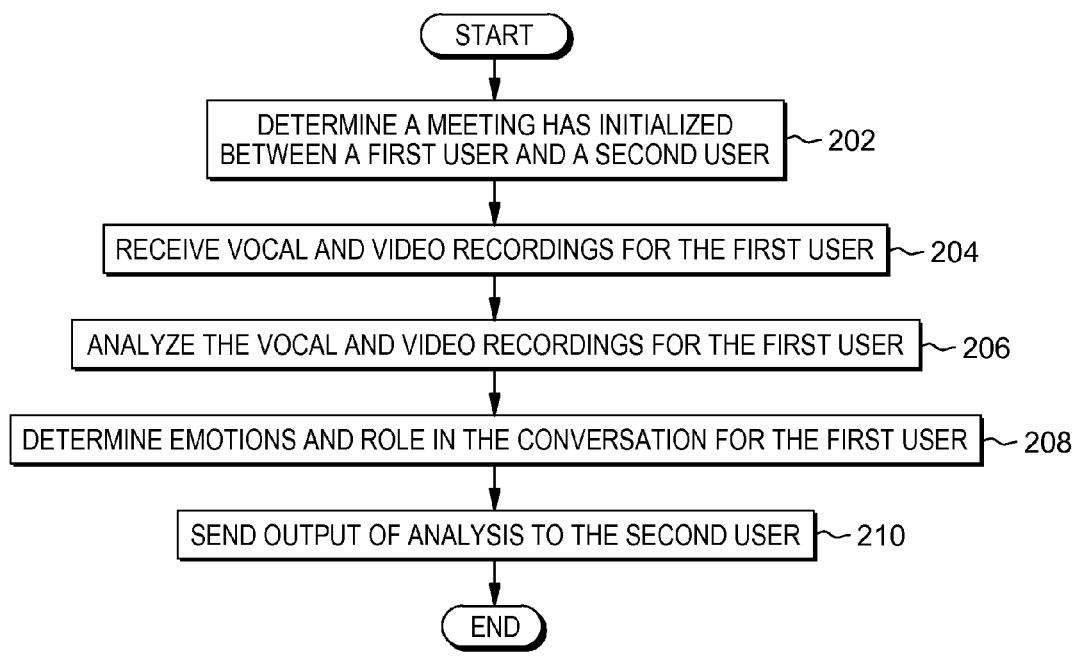
FIG. 2 is a flowchart depicting one embodiment of a conversational analytics program analyzing vocal and video recordings, in accordance with the present invention.

FIG. 2 is a flowchart depicting one embodiment of a conversational analytics program analyzing vocal and video recordings, in accordance with the present invention. As depicted, the method includes determining (202) a meeting has initialized between a first user and a second user, receiving (204) vocal and video recordings for the first user, analyzing (206) the vocal and video recordings for the first user, determining (208) emotions and role in the conversation for the first user, and sending (210) output of the analysis to the second user. In one embodiment, the method is conversational analytics program 108.

The method may commence by determining (202) a meeting has initialized between a first user and a second user. The meeting between the first user and the second user can include but is not limited to, a conference call, a video conference, an online meeting, or any type of meeting where vocal and/or video recordings are produced during the duration of the meeting. In one embodiment, the meeting between the first user and second user is supported by a service provider. For example, a video conference can include a first user logging into an account of the service provider and initiating a video conference with a second user, where the second user is logged into another account of the service provider. In this embodiment, conversational analytics program 108 determines a meeting has initialized between a first user and a second user when a client device (e.g., tablet computer) for the first user is producing vocal and video recordings. In another embodiment, conversational analytics program 108 determines a meeting has initialized between a first user and a second user by receiving a notification from a service provider that a meeting (i.e., video conference) has begun between the first user and the second user.

The method may continue by receiving (204) vocal and video recordings for the first user. In this embodiment, conversational analytics program 108 receives vocal and video recordings from a client device associated with the first user. A microphone on the client device records the speech of the first user and a camera on the client device records facial expressions and/or body gestures of the first user. The client device can cache the vocal and video recordings prior to sending the vocal and video recordings to conversational analytics program 108. The vocal and video recording conversational analytics program 108 receives are time stamped such that the vocal recordings for a particular time period match the video recordings for the same particular time period. Conversational analytics program 108 has the ability to receive the vocal and video recordings in the form of streaming data or can receive the vocal and video recordings in pre-defined time intervals. For example, conversational analytics program 108 can receive the vocal and video recordings in pre-defined time intervals of thirty seconds or one minute.

In another embodiment, conversational analytics program 108 receives vocal and video recordings, along with data from facial recognition software and gesture recognition software from a client device associated with the first user. The facial recognition software has the ability to identify facial features such as, eyebrows, eyes, nose, mouth, tongue, chin, and ears. The gesture recognition software has the ability to identify gestures such as, arms being crossed, arms being waved, fingers being pointed, and fists being clenched. In another embodiment, the facial recognition software and the gesture recognition software is located on server computer 102. Conversational analytics program 108 can receive the identified gestures from the gesture recognition software and the identified facial expressions from the facial recognition software, along with the vocal and video recordings for a user. The identified gestures and facial expression data can include time stamps to match the identified gestures and facial expressions for a particular time period with the vocal and video recordings for the same particular time period.

The method may continue by analyzing (206) the vocal and video recordings for the first user. In this embodiment, conversational analytics program 108 analyzes the vocal recordings by identifying and measuring various parameters for speech. The various parameters for speech may include but are not limited to measures of: pauses, hesitations, interruptions, vibrato, stress, timbre, stuttering, laughter, volume, and word rate. Subsequent to identifying and measuring various parameters for speech, conversational analytics program 108 analyzes the parameters for speech and produces output data points. Conversational analytics program 108 utilizes the output data points to determine emotions and role in the conversation for the first user.

The measure of pauses and hesitations represents a duration of time for which the first user does not speak subsequent to, for example, being asked a question by the second user or between speaking a first sentence and a second sentence. Conversational analytics program 108 can determine if a pause or hesitation meets a pre-defined duration of time and based on the determination, identify an output data point. In one example, subsequent to conversational analytics program 108 determining the pause or hesitation meets or exceeds the pre-defined duration of time (e.g., three seconds), conversational analytics program 108 identifies an output data point as "nervous". In a second example, subsequent to conversational analytics program 108 determining the pause or hesitation does not meet the pre-defined duration of time (e.g., three seconds), conversational analytics program 108 identifies an output data point as "relaxed".

The measure of interruptions represents a number of instances where the first user interrupts the second user, while the second user is speaking, in a particular duration of time. Conversational analytics program 108 can determine if a number of interruptions by the first user meets a pre-defined value (i.e., number of interruptions) for the particular duration of time and based on the determination, identify an output data point. In one example, subsequent to conversational analytics program 108 determining the number of interruptions by the first user meets or exceeds the pre-defined value (e.g., four interruptions) for the particular duration of time (e.g., five minutes), conversational analytics program 108 identifies an output data point as "rude". Conversational analytics program 108 can also identify multiple output data points for example, "rude" and "controlling". In a second example, subsequent to conversational analytics program 108 determining the number of interruptions by the first user does not meet the pre-defined value for a number interruptions for the particular duration of time conversational analytics program 108 identifies an output data point as "nervous". In a third example, subsequent to conversational analytics program 108 determining the number of interruptions by the first user does not meet the pre-defined value for a number of interruptions and the number of interruptions is zero for the particular duration of time, conversational analytics program 108 identifies output data points as "respectfully" and "listener".

The measure of vibrato represents a variation and a speed in pitch of speech of the first user when speaking with the second user. Vibrato is measured in terms of frequency over a particular duration of time. Conversational analytics program 108 can determine if vibrato in the speech of the first user reaches a specified frequency during a pre-defined duration of time and based on the determination, identify an output data point. In one example, subsequent to conversational analytics program 108 determining a vibrato in the speech of the first user reaches a specified frequency during a pre-defined duration of time conversational analytics program 108, identifies output data points as "authoritative" and "engaging". In a second example, subsequent to conversational analytics program 108 determining a vibrato in the speech of the first user does not reach a specified frequency during a pre-defined duration of time, conversational analytics program 108 identifies output data points as "diffident" and "unengaging".

The measure of stress represents variation in stress levels in the voice of the first user when speaking with the second user. Stress levels are measured by analyzing micro tremors in the first user's voice and converting the micro tremors via a voice stress analysis algorithm into scaled stress values. Conversational analytics program 108 can determine if a scaled stress value in the speech of the first user reaches a specified stress value level and based on the determination, identify an output data point. In one example, subsequent to conversational analytics program 108 determining a scaled stress value in the speech of the first user reaches a specified stress value level, conversational analytics program 108 identifies output data points as "stressed" and "aggravated". In a second example, subsequent to conversational analytics program 108 determining a scaled stress value in the speech of the first user does not reach a specified stress value level, conversational analytics program 108 identifies an output data point as "calm".

The measure of timbre represents the tone quality in the voice of the first user when speaking with the second user. Timbre is measured by analyzing the spectrum and envelope in the tone in the first user's voice and converting the spectrum and envelope via an algorithm into scaled tone quality values. Conversational analytics program 108 can determine if a scaled tone quality value in the speech of the first user falls below a particular tone quality value level and based on the determination, identify an output data point. In one example, subsequent to conversational analytics program 108 determining a scaled tone quality value in the speech of the first user falls below a particular tone quality value level, conversational analytics program 108 identifies output data points as "opaque" and "unconfident". In a second example, subsequent to conversational analytics program 108 determining a scaled tone quality value in the speech of the first user is above a particular tone quality value level, conversational analytics program 108 identifies output data points as "concise" and "confident".

The measure of stuttering represents a number of instances the first user repeats a letter or portion of a word while speaking with the second user. Stuttering is measured in terms of a number of stutter occurrences over a particular duration of time. Conversational analytics program 108 can determine if a number of stutter occurrences over a particular duration of time meets or exceeds a pre-defined value and based on the determination, identify an output data point. In one example, subsequent to conversational analytics program 108 determining a number of stutter occurrences over a particular duration of time (e.g., five minutes) meets or exceeds a pre-defined value (e.g., two stutter occurrences), conversational analytics program 108 identifies output data points as "nervous" and "anxious". In a second example, subsequent to conversational analytics program 108 determining a number of stutter occurrences over a particular duration of time (e.g., five minutes) does not exceed a pre-defined value (e.g., two stutter occurrences), conversational analytics program 108 identifies output data points as "confident" and "affirmative".

The measure of laughter represents a number of instances the first user laughs while speaking with the second user. Laughter is measured in terms of a number of laughter occurrences over a particular duration of time, where pattern recognition software identifies laugher in terms of repetitive short exhaling and audible variations in speech. Conversational analytics program 108 can determine if a number of laughter occurrences over a particular duration of time meets or exceeds a pre-defined value and based on the determination, identify an output data point. In one example, subsequent to conversational analytics program 108 determining a number of laughter occurrences over a particular duration of time (e.g., five minutes) meets or exceeds a pre-defined value (e.g., two laughter occurrences), conversational analytics program 108 identifies output data points as "engaging" and "interested". In a second example, subsequent to conversational analytics program 108 determining a number of laughter occurrences over a particular duration of time (e.g., five minutes) does not exceed a pre-defined value (e.g., two laughter occurrences), conversational analytics program 108 identifies output data points as "unappealing" and "disinterested".

The measure of volume represents the projecting volume of the first user while speaking with the second user. The projecting volume of the first user is measured in terms of decibels (dB). Conversational analytics program 108 can determine if a projecting volume of the first user meets or exceeds a particular decibel value and based on the determination, identify an output data point. In one example, subsequent to conversational analytics program 108 determining a projecting volume (e.g., 75 dB) of the first user meets or exceeds a particular decibel value (e.g., 70 dB), conversational analytics program 108 identifies output data points as "authoritative" and "stressed". In a second example, subsequent to conversational analytics program 108 determining a projecting volume (e.g., 65 dB) of the first user does not exceed a particular decibel value (e.g., 70 dB), conversational analytics program 108 identifies output data points as "calm" and "composed".

The measure of word rate represents the rate of which first user is speaking with the second user. Conversational analytics program 108 can measure the word rate of the first user in terms of words per minute. Conversational analytics program 108 can determine if a word rate for the first user meets or exceeds a particular pre-determined word rate value and based on the determination, identify an output data point. In one example, subsequent to conversational analytics program 108 determining a word rate (e.g., 180 words/min) for the first user meets or exceeds a particular pre-determined word rate value (e.g., 160 words/min) conversational analytics program 108 identifies output data points as "excited" and "anxious". In a second example, subsequent to conversational analytics program 108 determining a word rate (e.g., 145 words/min) for the first user does not exceed a particular pre-determined word rate value (e.g., 160 words/min), conversational analytics program 108 identifies output data points as "articulate" and "composed".

In this embodiment, conversational analytics program 108 analyzes the video recordings by identifying and measuring various parameters for gestures by the first user. The various parameters for gestures by the first user include but are not limited to measures of: folding arms across the chest, clenching fists, smiling, frowning, raising eyebrows, nodding, and flaring nostrils. Subsequent to identifying and measuring various parameters for gestures by the first user, conversational analytics program 108 analyzes the parameters for the gestures by the first user and produces output data points. In this embodiment, conversational analytics program 108 compiles the output data points continuously as each gesture is identified in the received video recording. Conversational analytics program 108 utilizes the output data points to determine emotions and role in the conversation for the first user.

In the event conversational analytics program 108 determines the arms of the first user are folded across the chest, conversational analytics program 108 identifies output data points as "defensive" and "harsh". In the event conversational analytics program 108 determines the first user has clenched fists, conversational analytics program 108 identifies output data points as "hostile" and "confrontational". In the event conversational analytics program 108 determines the first user is smiling, conversational analytics program 108 identifies output data points as "engaging" and "positive response". In the event conversational analytics program 108 determines the first user is frowning, conversational analytics program 108 identifies output data points as "worried" and "negative response". In the event conversational analytics program 108 determines the eyebrows of the first user are raised, conversational analytics program 108 identifies output data points as "surprised" and "interested". In the event conversational analytics program 108 determines the first user is nodding, conversational analytics program 108 identifies output data points as "interested" and "attentive". In the event conversational analytics program 108 determines the nostrils of the first user are flaring, conversational analytics program 108 identifies output data points as "angry" and "agitated".

The method may continue by determining (208) emotions and role in the conversation for the first user. In this embodiment, conversational analytics program 108 utilizes the output data points from the identified parameters for speech and gestures of the first user to determine emotions and role in the conversation for the first user. Conversational analytics program 108 can identify recurring output data points and select the three highest recurring output data points. Based on the three highest recurring output data points, conversational analytics program 108 determines emotions and a role in the conversation for the first user. In one example, conversational analytics program 108 identifies the three highest recurring output data points as "attentive", "composed", and "listener" and determines the three highest recurring output data points represent the emotions of the first user. Based on the three highest recurring output data points, "attentive", "composed", and "listener", conversational analytics program 108 determines the role of the first user is a listener or "interviewee".

In a second example, conversational analytics program 108 identifies the three highest recurring output data points as "aggressive", "articulate", and "authoritative" and determines the three highest recurring output data points represent the emotions of the first user. Based on the three highest recurring output data points, "aggressive", "articulate", and "authoritative", conversational analytics program 108 determines the role of the first user is a speaker or in a higher job title, with respect to the first user. Conversational analytics program 108 can utilize a pre-defined analysis tree, where the analysis tree maps out a path to a particular emotion and a particular role based on the identified output data points.

The method may continue by sending (210) output of the analysis to the second user. In this embodiment, conversational analytics program 108 sends output of the analysis to the second user, wherein the output of the analysis includes the determined emotions, role in conversation, and information about the previously identified output data points. The information about the previously identified output data points can include a graph representing an amount for recurring instances of each output data point, a tree map with an identified path to the particular emotions and role of the first user, and a list of all the previously identified output data points. The second user can view the output of the analysis in a user interface on a client device associated with the second user. In another embodiment, conversational analytics program 108 has the ability to display the output of the analysis in a user interface of a client device associated with the second user.

Figure 3:
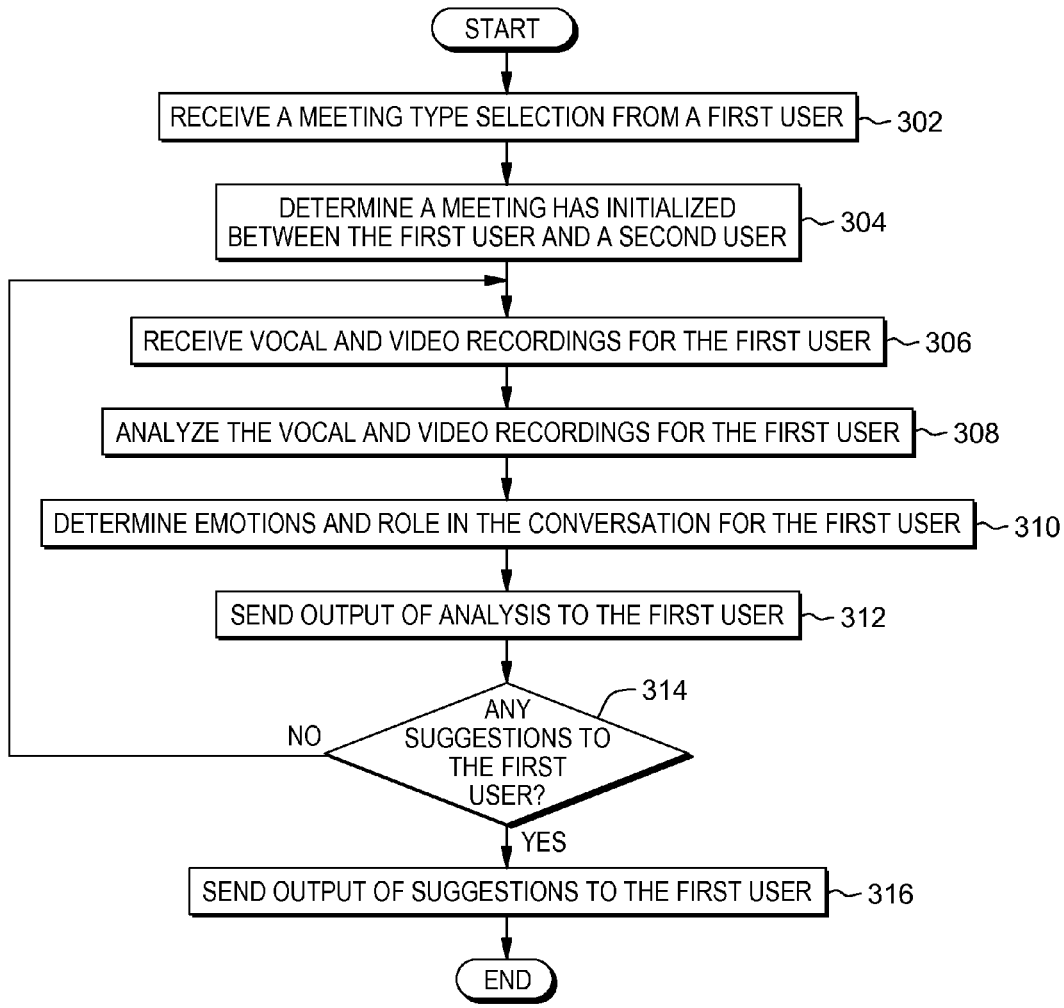
FIG. 3 is a flowchart depicting one embodiment of a conversational analytics program analyzing vocal and video recordings and providing suggestions to a user, in accordance with the present invention.

FIG. 3 is a flowchart depicting one embodiment of a conversational analytics program analyzing vocal and video recordings and providing suggestions to a user, in accordance with the present invention. As depicted, the method includes receiving (302) a meeting type selection from a first user, determining (304) a meeting has initialized between the first user and a second user, receiving (306) vocal and video recordings for the first user, analyzing (308) the vocal and video recordings for the first user, determining (310) emotions and role in the conversation for the first user, sending (312) output of analysis to the first user, determining (314) whether there are any suggestions to the first user, and sending (316) output of suggestions to the first user. In one embodiment, the method is conversational analytics program 108.

The method may commence by receiving (302) a meeting type selection from a first user. In this embodiment, conversational analytics program 108 receives a meeting type selection from a first user specifying the meeting type as an "interview". Other meeting type selections can include but are not limited to a formal speech, an informal speech, a motivational speech, an engaging speech, and a work presentation. The meeting type selection allows for conversational analytics program 108 to provide an output of suggestions tailored specifically to the meeting type and the determined role for the first use. Alternatively, conversational analytics program 108 can receive a selection identifying a role of the first user, for example, as an "interviewee" or "interviewer" in the "interview". Conversational analytics program 108 can provide options to the first user whether to analyze vocal recordings, speech recordings, or both vocal and speech recordings.

The method may continue by determining (304) a meeting has initialized between the first user and a second user. The meeting between the first user and the second user can include but is not limited to, a conference call, a video conference, an online meeting, or any type of meeting where vocal and/or video recordings are produced during the duration of the meeting. In this embodiment, conversational analytics program 108 determines a meeting has initialized between a first user and a second user when a client device (e.g., tablet computer) for the first user is producing vocal and video recordings. In another embodiment, conversational analytics program 108 determines a meeting has initialized between a first user and a second user by receiving a notification from a service provider that a meeting (i.e., video conference) has begun between the first user and the second user.

The method may continue by receiving (306) the vocal and video recordings for the first user. In this embodiment, conversational analytics program 108 receives vocal and video recordings from a client device associated with the first user. A microphone on the client device records the speech of the first user and a camera on the client device records facial expressions and/or body gestures of the first user. The vocal and video recording conversational analytics program 108 receives are time stamped such that the vocal recordings for a particular time period match the video recordings for the same particular time period. Conversational analytics program 108 has the ability to receive the vocal and video recordings in the form of streaming data or can receive the vocal and video recordings in pre-defined time intervals. For example, conversational analytics program 108 can receive the vocal and video recordings in pre-defined time intervals of thirty seconds or one minute. In another embodiment, conversational analytics program 108 receives vocal and video recordings, along with data from facial recognition software and gesture recognition software from a client device associated with the first user.

The method may continue by analyzing (308) the vocal and video recordings for the first user. As previously discussed in FIG. 2, conversational analytics program 108 analyzes the vocal recordings by identifying and measuring various parameters for speech. The various parameters for speech include but are not limited to measures of: pauses, hesitations, interruptions, vibrato, stress, timbre, stuttering, laughter, volume, and word rate. Additionally, conversational analytics program 108 analyzes the video recordings by identifying and measuring various parameters for gestures by the first user. The various parameters for gestures by the first user include but are not limited to measures of: folding arms across the chest, clenching fists, smiling, frowning, raising eyebrows, nodding, and flaring nostrils. Subsequent to identifying and measuring various parameters for speech and gestures by the first user, conversational analytics program 108 analyzes the parameters for the speech and gestures by the first user and produces output data points. Conversational analytics program 108 utilizes the output data points to determine emotions and role in the conversation for the first user.

The method may continue by determining (310) emotions and role in the conversation for the first user. In this embodiment, conversational analytics program 108 utilizes the output data points from the identified parameters for speech and gestures of the first user to determine emotions and role in the conversation for the first user. Conversational analytics program 108 can identify recurring output data points and select the three highest recurring output data points. Based on the three highest recurring output data points, conversational analytics program 108 determines emotions and a role in the conversation for the first user. In one example, conversational analytics program 108 identifies the three highest recurring output data points as "attentive", "composed", and "listener" and determines the three highest recurring output data points represent the emotions of the first user. Based on the three highest recurring output data points, "attentive", "composed", and "listener", conversational analytics program 108 determines the role of the first user is a listener or "interviewee".

The method may continue by sending (312) output of analysis to the first user. In this embodiment, conversational analytics program 108 sends output of the analysis to the first user, wherein the output of the analysis includes the determine emotions, role in conversation, and information about the previously identified output data points. The information about the previously identified output data points can include a graph representing an amount for recurring instances of each output data point, a tree map with an identified path to the particular emotions and role of the first user, and a list of all the previously identified output data points. The first user can view the output of the analysis in a user interface on a client device associated with the first user. In another embodiment, conversational analytics program 108 has the ability to display the output of the analysis in a user interface of a client device associated with the first user.

The method may continue by determining (314) whether there are any suggestions for the first user. In the event conversational analytics program 108 determines there are suggestions for the first user ("yes" branch, 314), the method may continue by sending (316) output of suggestions to the first user. In the event conversational analytics program 108 determines there are no suggestions for the first user ("no" branch, 314), the method may revert back to receiving (306) vocal and video recordings for the user.

In one embodiment, conversational analytics program 108 determines whether there are any suggestions for the first user by determining whether the determined emotions and role in the conversation for the first user correspond to the received meeting type selection from the first user. In one example, conversational analytics program 108 determines the emotions of the first user to be "nervous", "defensive", and "interested" and the role of the first user as an "interviewee" in an interview type meeting. Conversational analytics program 108 compares the emotions of the first user against pre-determined emotions for an "interviewee" in an interview type meeting and determines that "nervous" and "defensive" are not emotions associated with an "interviewee" in an interview type meeting. Conversational analytics program 108 flags the emotions, "nervous" and "defensive" and identifies a suggestion to the first user to convey emotions, "composed" and "assertive". Additionally, conversational analytics program 108 can suggest possible gestures to convey the suggested emotions. For example, conversational analytics program 108 can suggest the first user unfold their arms across the chest to reverse the "defensive" emotion.

The method may continue by sending (316) output of suggestions to the first user. In this embodiment, conversational analytics program 108 sends an output of the suggestions to the first user, wherein the output of the suggestions includes the suggestions tailored to the output analysis and the meeting type. The first user can view the output of the suggestion in a user interface on a client device associated with the first user. In another embodiment, conversational analytics program 108 has the ability to display the output of the suggestions in a user interface of a client device associated with the first user.

Figure 4:
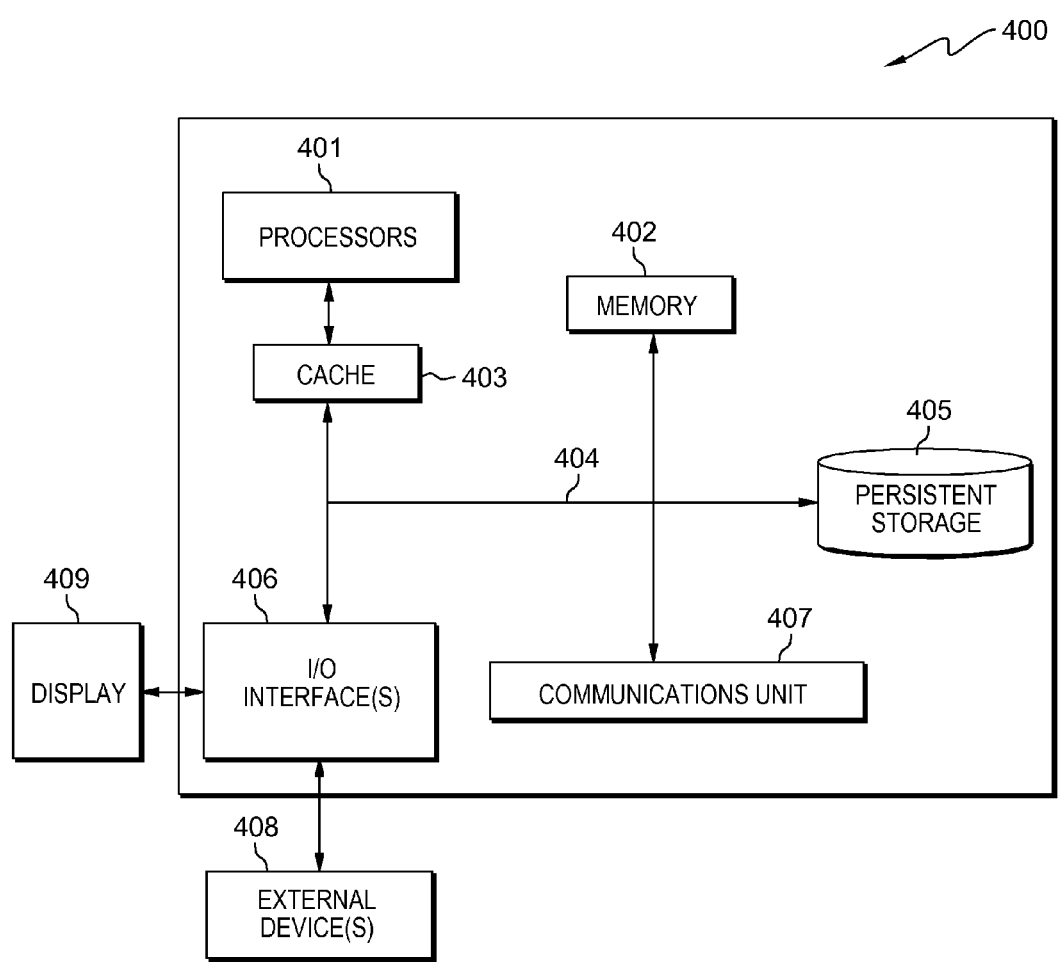
FIG. 4 is a block diagram of components of a computer system, such as the computer server of FIG. 1, in an embodiment in accordance with the present invention.

FIG. 4 depicts computer system 400, where server computer 102, client device 104A, 104B, and 104C are each an example of a system that include conversational analytics program 108. The computer system includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product comprising:
one or more computer readable tangible storage media and program instructions stored on at least one of the one or more storage media, the program instructions comprising:
program instructions to determine a meeting has initialized between a first user and a second user, wherein vocal and video recordings are produced for at least the first user;
program instructions to receive the vocal and video recordings for the first user;
program instructions to analyze the vocal and video recordings for the first user according to one or more parameters for speech and one or more parameters for gestures;
program instructions to identify the one or more parameters for gestures, wherein the one or more parameters are selected from a group of measures including: folding arms across the chest, clenching fists, smiling, frowning, raising eyebrows, nodding, and flaring nostrils;
program instructions to analyze the one or more parameters for gestures;
program instructions to produce at least one output data point for each of the one or more parameters for gestures;
program instructions to determine one or more emotions and a role in the meeting for the first user based at least on the analyzed vocal and video recordings;
program instructions to identify one or more highest recurring output data points from the at least one output data point for each of the one or more parameters for gestures;
program instructions to identify the one or more highest recurring output data points as the one or more emotions for the first user;
program instructions to determine the role in the meeting for the first user based at least on the identified one or more emotions for the first user; and
program instructions to send an output of analysis to at least one of the first user and the second user, wherein the output of analysis includes at least the determined one or more emotions and the role in the meeting for the first user.

2. The computer program product of claim 1, wherein analyzing the vocal and video recordings for the first user according to one or more parameters for speech and one or more parameters for gestures comprises program instructions, stored on the one or more computer readable storage media, which when executed by a processor, cause the processor to:
identify the one or more parameters for speech, wherein the one or more parameters are selected from a group of measures including: pauses, hesitations, interruptions, vibrato, stress, timbre, stuttering, laughter, volume, and word rate;
analyze the one or more parameters for speech; and
produce at least one output data point for each of the one or more parameters for speech.

3. The computer program product of claim 1, further comprising program instructions, stored on the one or more computer readable storage media, which when executed by a processor, cause the processor to:
receive a meeting type selection from the first user, and responsive to determining one or more suggestions for the first user based at least on the meeting type selection, send an output of the one or more suggestions to the first user.

4. The computer program product of claim 2, wherein determining one or more emotions and a role in the meeting for the first user comprises program instructions, stored on the one or more computer readable storage media, which when executed by a processor, cause the processor to:
identify one or more highest recurring output data points from the at least one output data point for each of the one or more parameters for gestures;
identify the one or more highest recurring output data points as the one or more emotions for the first user; and
determine the role in the meeting for the first user based at least on the identified one or more emotions for the first user.

5. The computer program product of claim 1, wherein receiving vocal and video recordings for the first user comprises program instructions, stored on the one or more computer readable storage media, which when executed by a processor, cause the processor to:
receive vocal recordings from a speech recognition software; and
receive video recordings from a gesture recognition software.

6. A computer system comprising:
one or more computer processors;
one or more computer readable storage media; and
program instructions stored on the computer readable storage media for execution by at least one of the one or more computer processors, the program instructions comprising:
program instructions to determine a meeting has initialized between a first user and a second user, wherein vocal and video recordings are produced for at least the first user;
program instructions to receive the vocal and video recordings for the first user;
program instructions to analyze the vocal and video recordings for the first user according to one or more parameters for speech and one or more parameters for gestures;
program instructions to identify the one or more parameters for gestures, wherein the one or more parameters are selected from a group of measures including: folding arms across the chest, clenching fists, smiling, frowning, raising eyebrows, nodding, and flaring nostrils;
program instructions to analyze the one or more parameters for gestures;
program instructions to produce at least one output data point for each of the one or more parameters for gestures;
program instructions to determine one or more emotions and a role in the meeting for the first user based at least on the analyzed vocal and video recordings;
program instructions to identify one or more highest recurring output data points from the at least one output data point for each of the one or more parameters for gestures;

program instructions to identify the one or more highest recurring output data points as the one or more emotions for the first user;

program instructions to determine the role in the meeting for the first user based at least on the identified one or more emotions for the first user; and program instructions to send an output of analysis to at least one of the first user and the second user, wherein the output of analysis includes at least the determined one or more emotions and the role in the meeting for the first user.

7. The computer system of claim 6, wherein analyzing the vocal and video recordings for the first user according to one or more parameters for speech and one or more parameters for gestures comprises program instructions, stored on the one or more computer readable storage media, which when executed by a processor, cause the processor to:

identify the one or more parameters for speech, wherein the one or more parameters are selected from a group of measures including: pauses, hesitations, interruptions, vibrato, stress, timbre, stuttering, laughter, volume, and word rate;

analyze the one or more parameters for speech; and produce at least one output data point for each of the one or more parameters for speech.

8. The computer system of claim 6, further comprising program instructions, stored on the one or more computer readable storage media, which when executed by a processor, cause the processor to:

receive a meeting type selection from the first user, and responsive to determining one or more suggestions for the first user based at least on the meeting type selection, send an output of the one or more suggestions to the first user.

9. The computer system of claim 7, wherein determining one or more emotions and a role in the meeting for the first user comprises program instructions, stored on the one or more computer readable storage media, which when executed by a processor, cause the processor to:

identify one or more highest recurring output data points from the at least one output data point for each of the one or more parameters for gestures;

identify the one or more highest recurring output data points as the one or more emotions for the first user; and determine the role in the meeting for the first user based at least on the identified one or more emotions for the first user.

10. The computer system of claim 6, wherein receiving vocal and video recordings for the first user comprises program instructions, stored on the one or more computer readable storage media, which when executed by a processor, cause the processor to:

receive vocal recordings from a speech recognition software; and receive video recordings from a gesture recognition software.

11. A method comprising:

determining, by one or more processors, a meeting has initialized between a first user and a second user, wherein vocal and video recordings are produced for at least the first user;

receiving, by one or more processors, the vocal and video recordings for the first user;

analyzing, by one or more processors, the vocal and video recordings for the first user according to one or more parameters for speech and one or more parameters for gestures;

identifying, by one or more processors, the one or more parameters for gestures, wherein the one or more parameters are selected from a group of measures including: folding arms across the chest, clenching fists, smiling, frowning, raising eyebrows, nodding, and flaring nostrils;

analyzing, by one or more processors, the one or more parameters for gestures;

producing, by one or more processors, at least one output data point for each of the one or more parameters for gestures;

determining, by one or more processors, one or more emotions and a role in the meeting for the first user based at least on the analyzed vocal and video recordings;

identifying, by one or more processors, one or more highest recurring output data points from the at least one output data point for each of the one or more parameters for gestures;

identifying, by one or more processors, the one or more highest recurring output data points as the one or more emotions for the first user;

determining, by one or more processors, the role in the meeting for the first user based at least on the identified one or more emotions for the first user; and sending, by one or more processors, an output of analysis to at least one of the first user and the second user, wherein the output of analysis includes at least the determined one or more emotions and the role in the meeting for the first user.

12. The method of claim 11, wherein analyzing the vocal and video recordings for the first user according to one or more parameters for speech and one or more parameters for gestures comprises:

identifying, by one or more processors, the one or more parameters for speech, wherein the one or more parameters are selected from a group of measures including: pauses, hesitations, interruptions, vibrato, stress, timbre, stuttering, laughter, volume, and word rate;

analyzing, by one or more processors, the one or more parameters for speech; and producing, by one or more processors, at least one output data point for each of the one or more parameters for speech.

13. The method of claim 11, further comprising:

receiving, by one or more processors, a meeting type selection from the first user, and responsive to determining one or more suggestions for the first user based at least on the meeting type selection, sending, by one or more processors, an output of the one or more suggestions to the first user.

14. The method of claim 12, wherein determining one or more emotions and a role in the meeting for the first user comprises:

identifying, by one or more processors, one or more highest recurring output data points from the at least one output data point for each of the one or more parameters for gestures;

identifying, by one or more processors, the one or more highest recurring output data points as the one or more emotions for the first user; and determining, by one or more processors, the role in the meeting for the first user based at least on the identified one or more emotions for the first user.

15. The method of claim 11, wherein receiving vocal and video recordings for the first user comprises:
receiving, by one or more processors, vocal recordings from a speech recognition software; and
receiving, by one or more processors, video recordings from a gesture recognition software.

\* \* \* \* \*